(12) United States Patent
Finch et al.

(10) Patent No.: US 11,294,944 B2
(45) Date of Patent: Apr. 5, 2022

(54) CORRECTION AND COMPLETION OF SEARCH QUERIES

(71) Applicant: Apple Inc., Cupertino, CA (US)

(72) Inventors: Andrew M. Finch, Cupertino, CA (US); Zinaida A. Pozen, San Francisco, CA (US); Matthias Paulik, Belmont, CA (US); Arnaud Legendre, San Francisco, CA (US); Olga I. Gurevich, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 414 days.

(21) Appl. No.: 16/147,565

(22) Filed: Sep. 28, 2018

(65) Prior Publication Data

US 2019/0370393 A1  Dec. 5, 2019

Related U.S. Application Data

(60) Provisional application No. 62/679,892, filed on Jun. 3, 2018.

(51) Int. Cl.
   *G06N 20/00* (2019.01)
   *G06F 16/33* (2019.01)
   *G06F 16/9032* (2019.01)
   *G06F 40/232* (2020.01)

(52) U.S. Cl.
   CPC .... *G06F 16/3338* (2019.01); *G06F 16/90324* (2019.01); *G06F 40/232* (2020.01); *G06N 20/00* (2019.01)

(58) Field of Classification Search
   None
   See application file for complete search history.

(56) References Cited

U.S. PATENT DOCUMENTS

| 9,606,986 B2 | 3/2017 | Bellegarda |
| 2012/0066057 A1* | 3/2012 | Ramer ............... G06Q 30/0247 705/14.46 |
| 2014/0040741 A1 | 2/2014 | Os |
| 2014/0278051 A1* | 9/2014 | McGavran ............. G06N 20/00 701/400 |

(Continued)

OTHER PUBLICATIONS

Bahdanau et al., "Neural Machine Translation by Jointly Learning to Align and Translate," Published as a conference paper at ICLR 2015, retrieved from https://arxiv.org/pdf/1409.0473v7.pdf, 15 pages.

(Continued)

*Primary Examiner* — Wilson Lee
(74) *Attorney, Agent, or Firm* — Morgan, Lewis & Bockius LLP

(57) ABSTRACT

Aspects of subject technology provide systems and methods for simultaneously spell-correcting and completing partial search queries being entered by a user on the user's electronic device. An apparatus such as a computing device may receive partial search queries from the user's electronic device as each character of the partial search query is entered by the user. The apparatus may utilize a machine-learning model to generate suggested queries that include spelling-corrected versions of the received partial query, query completion suggestions for the partial query, and/or spelling-corrected completion suggestions for the partial query.

23 Claims, 10 Drawing Sheets

(56) References Cited

U.S. PATENT DOCUMENTS

| | | | |
|---|---|---|---|
| 2015/0095120 A1* | 4/2015 | Gibson | G06Q 10/06398 |
| | | | 705/7.42 |
| 2016/0125462 A1* | 5/2016 | Mallah | G06F 16/285 |
| | | | 705/14.54 |
| 2016/0267128 A1* | 9/2016 | Dumoulin | G06F 16/243 |
| 2017/0357632 A1 | 12/2017 | Pagallo et al. | |
| 2019/0236148 A1* | 8/2019 | DeFelice | G06F 40/216 |
| 2019/0295527 A1* | 9/2019 | Pore | G10L 13/00 |

OTHER PUBLICATIONS

Hasan et al., "Spelling Correction of User Search Queries through Statistical Machine Translation," Proceedings of the 2015 Conference on Emperical Methods in Natural Language Processing, Sep. 2015, pp. 451-460, retrieved from https://www.cs.cmu.edu/~ark/EMNLP-2015/proceedings/EMNLP/pdf/EMNLP051.pdf.

Lee et al., "Fully Character-Level Nerual Machine Translation without Explicit Segmentation," Transactions of the Association for Computational Linguistics, 2017, vol. 5, pp. 365-378, retrieved from http://aclweb.org/anthology/Q17-1026.

Zhou et al., "Spelling Correction as a Foreign Language," May 2017, retrieved from https://pdfs.semanticscholar.org/dbaf/1fea70023c01ce7bfc60d130fea2540bbd38.pdf, 5 pages.

\* cited by examiner

CORRECTION AND COMPLETION OF SEARCH QUERIES

CROSS-REFERENCE TO RELATED APPLICATIONS

The present application claims the benefit of U.S. Provisional Patent Application Ser. No. 62/679,892, entitled "Correction and Completion of Search Queries," filed on Jun. 3, 2018, which is hereby incorporated by reference in its entirety for all purposes.

TECHNICAL FIELD

The present description relates generally to electronic search systems, and more particularly to correcting and completing search queries for electronic search systems.

BACKGROUND

Electronic devices commonly provide search capabilities by which a user of the device can send a search query to a search engine, e.g. at a server or locally on the device, responsive to which the search engine typically returns search results, such as Internet search results. However, the search queries generated by users often contain errors such as misspellings that can reduce the efficiency and accuracy with which the search engine produces the desired results for a given query.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
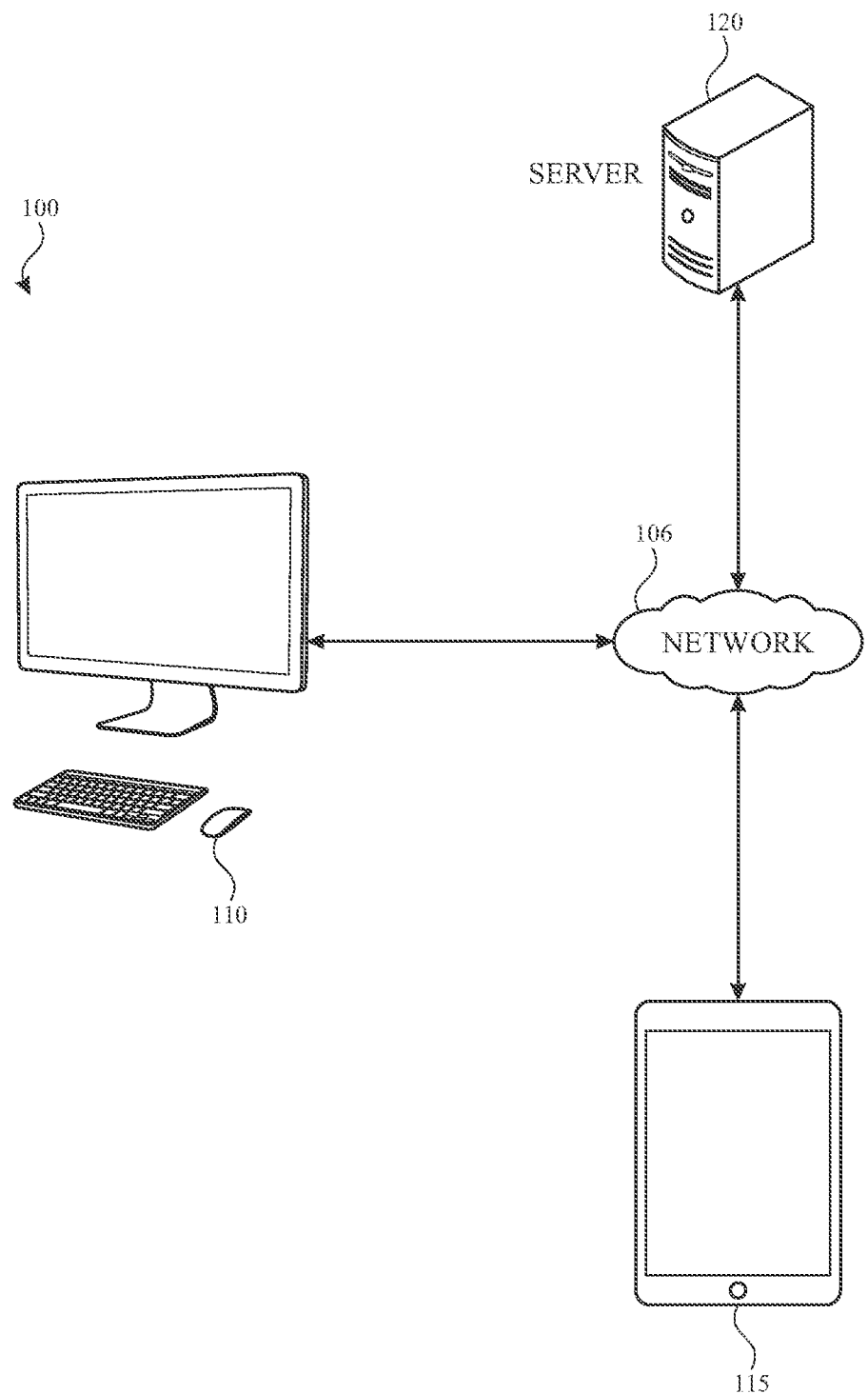
FIG. 1 illustrates an example network environment in which a system for correcting and completing search queries may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Search queries can be entered by a user of an electronic device, e.g., for transmission to a search server with a request to the server to perform a search (e.g., an internet search) based on the query. As the search queries are input by the user into, for example, a search application (or tool) or a search field of an internet browser application on the user's electronic device, partially input search queries are sometimes provided to the search server, so that the search server can increase the efficiency of the user search by suggesting query completions before the user has finished entering the complete search query. The suggested query completions can be provided from the server to the user device and can be selected by the user for transmission as the search query, for example if one of the suggested query completions is the query that the user intended to enter (or is determined by the user to be a better, more accurate, or more efficient search query than the user originally intended to enter).

However, users often introduce errors such as misspellings into a search query, even before the complete search query has been entered. For example, the user may intend to submit a search query for "restaurants near me", but may begin the query entry by typing "restu" instead of "resta". Accordingly, the user's intent in performing the search may be aligned with the correct spelling of the partial search query, as opposed to the misspelling of the partial search query that was input by the user.

One option for providing a spelling-corrected query completion suggestion is to complete the misspelled partial query to "restuarants near me" and then to identify and correct the misspelling to "restaurants near me". In this option, the server may recognize, using a lookup table, that previous users have previously submitted internet searches for "restuarants near me" after typing "restu", and then recognizing that "restuarants" is likely a misspelling of "restaurants".

Another option is to spell correct each partial query and then to complete the spelling corrected partial search query. However, this can be difficult and/or computationally inefficient because the partial queries may not be spelling-corrected to "restaurants" until more letters of the query have been entered. For example, the partial query "restu" may not return any spelling-corrections, as no five letter words sufficiently correspond to "restu". As another example, "restu" may be corrected to "rusty" which may be completed to "rusty nails", which may be entirely unrelated to the user's desired query.

With either of these options, a two-step process is required (a spelling correction step and a completion step), and results may only be returned if the partial query has been previously used or if, in each step, the partial query corresponds sufficiently to the desired query. It may also be difficult to properly determine the relevance and/or ranking of completed query suggestions generated from a two-step process.

In contrast, various aspects of the subject technology provide a machine-learning model trained to generate simultaneously spelling-corrected query completion suggestions in a joint process, even if the input query (or partial query) is badly misspelled and/or has never been received before by the server. The machine-learning model is trained using a training data set of past partial queries (e.g., correctly and incorrectly spelled partial queries) and user-selected or user-engaged search queries for each past partial query. The machine-learning model may utilize a deep neural network encoder-decoder architecture.

The use of the machine-learning model provides a natural ranking of spelling correction and/or completion suggestions that eliminate the difficult problem of blending separately generated corrections and completions in a query suggestions list. The machine-learning model can efficiently generalize the process of correction and completion from data for previously occurred misspellings, by effectively simultaneously learning keyboard layouts leading to common misspellings from typographical errors (e.g., from miss-keying letters nearby to the correct letter on a given keyboard), and morpho-phonetic phenomena that give rise to common misspellings (e.g., phonetic spellings of words). In this way, when a user types a misspelled partial query by hitting a nearby, but incorrect key, or by using a phonetic spelling, the machine-learning model can output spelling-corrected query completion suggestions, even if the model has never received that misspelled partial query before.

FIG. 1 illustrates an example network environment 100 in which spelling correction and completion of search queries with a machine-learning model may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110 and/or the server 120, the electronic device 115 and/or the server 120, and/or the electronic device 110 and/or the electronic device 115.

In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 115, and a server 120; however, the network environment 100 may include any number of electronic devices and any number of servers.

The electronic device 110 may be, for example, a desktop computer, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 110 is depicted as a desktop computer. The electronic device 110 may be, and/or may include all or part of, the electronic system discussed below with respect to FIG. 9. In one or more implementations, the electronic device 110 may provide a search application and/or a search feature in another application for conveying partial and/or complete search queries to a search server such as server 120 over the network 106.

The electronic device 115 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In FIG. 1, by way of example, the electronic device 115 is depicted as a tablet device with a touchscreen. In one or more implementations, the electronic device 115 may be, and/or may include all or part of the electronic system discussed below with respect to FIG. 9. In one or more implementations, the electronic device 115 may provide a search application and/or or a search feature in another application for conveying partial and/or complete search queries to a search server such as server 120 over the network 106.

In one or more implementations, the server 120 receives partial and/or complete search queries from electronic device 110 and/or electronic device 115, and returns query correction and/or completion suggestions and/or search results responsive to the partial or complete queries to electronic device 110 and/or electronic device 115. It should be appreciated that server 120 may represent one or several servers. For example, server 120 may include one or more servers that generate query suggestions responsive to received partial queries, one or more servers that generate network (e.g., internet) search results responsive to selected query suggestions and/or user-submitted complete queries, and/or one or more servers that train the machine-learning model using training data that includes previously selected spelling corrections and previously selected completions associated with previous user queries, or all of these operations may be performed by a single server.

Figure 2:
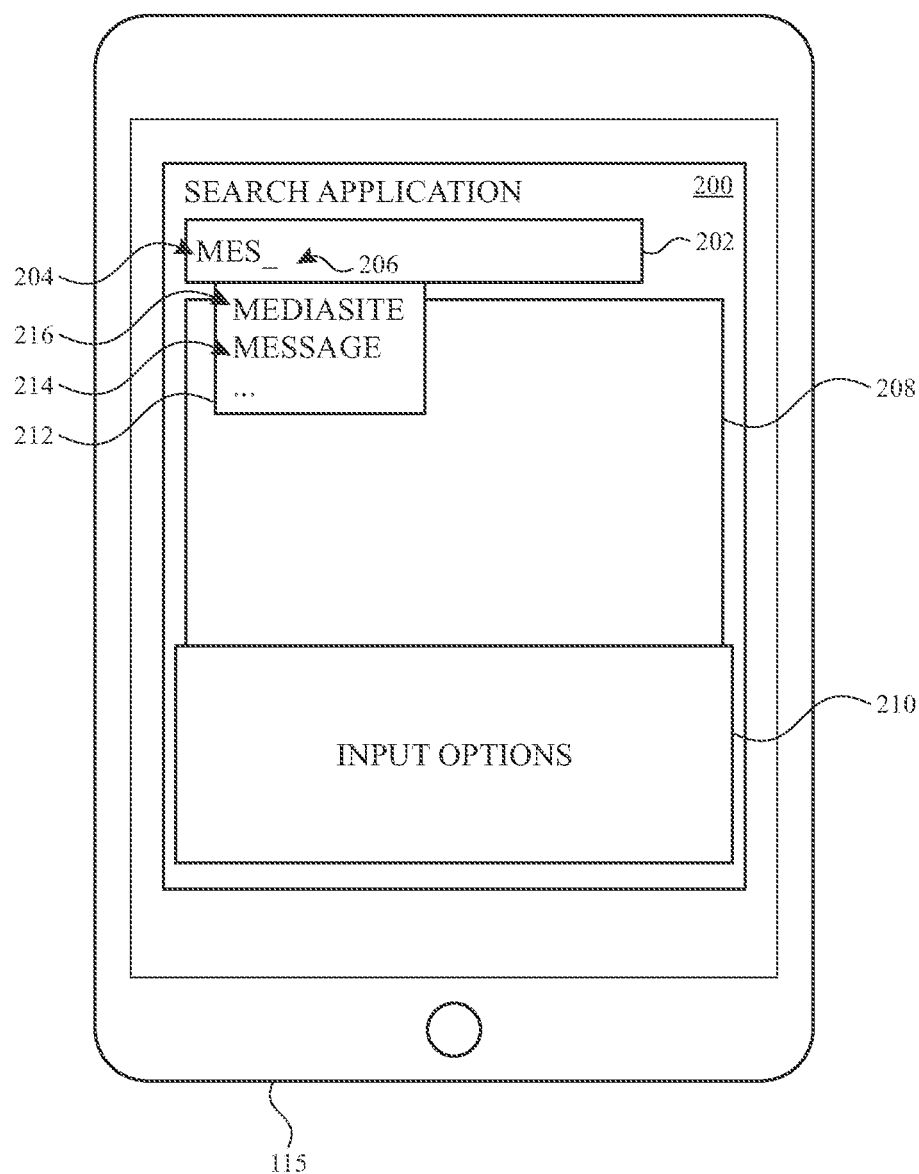
FIG. 2 illustrates a schematic diagram showing an exemplary user interface view during entry of a search query in accordance with one or more implementations.

FIG. 2 shows a user interface view during user entry of a search query in a search field 202 of a search application 200. Search application 200 may be a dedicated search application for electronic device 115 or may be a search function of another application such as a web browser application, a word processing application, a shopping application, or generally any application that allows for searching, and search application 200 may include an application content display field 208 such as a web page display field. For example, search field 202 may be embodied and/or embedded in the address bar of a web browser and application content display field 208 may display a web page that was most recently loaded by the web browser, which may include a display of internet search results provided to electronic device 115 responsive to a previous search query submission or responsive to a selection of a previously suggested query from server 120.

In the example of FIG. 2, the user of electronic device 115 has entered a partial query 204 including the three characters "m", "e", and "s" (e.g., using input options 210 such as a physical or display-generated keyboard). A cursor 206 in the search field 202 may indicate the location of the next character to be entered using input options 210. In order to allow server 120 to help spell-correct and/or complete the partial query 204, partial query 204 may be transmitted, without a specific input from the user (e.g., upon entry of each character or each group of characters), to server 120. In one example, partial query 204 is transmitted after each character is input. In another example, partial query 204 is transmitted to server 120 upon entry of each character after the second character. In another example, partial query 204 is transmitted to server 120 upon entry of each group of two characters, three characters, or upon entry of a specific character such a space or a comma (as examples).

In the example depicted in FIG. 2, partial query 204 is a misspelled partial query intended to be a portion of a complete search query for "mediasite" (e.g., a social media website, or a news media website). Because the keys for characters "s" and "d" are adjacent on a standard QWERTY keyboard, instead of entering the first three characters "med" of "mediasite", the user has entered partial query 204 as "mes".

As shown in FIG. 2, search application 200 displays, responsive to the entry of partial query 204, a list 212 of suggested search queries. In the example of FIG. 2, the suggested queries in list 212 include a spelling-corrected completion suggestion 216 and a completion suggestion 214 that does not include a spelling correction, each generated by the machine-learning model of server 120 responsive to receipt of partial query 204. List 212 may be a ranked list of spelling-corrected completion suggestions.

In the example, of FIG. 2, completion suggestion 214 includes the same three characters "mes" as entered in partial query 204, completed to include additional characters that form the word "message". In contrast, spelling-corrected completion suggestion 216 includes a modification to the three entered characters "mes" of partial query 204 (i.e., the character "s" has been changed to "d") and additional characters to form "mediasite".

List 212 may be a ranked list of spelling-corrected and/or completion suggestions, each of which is a direct output of the machine-learning model. In the example of FIG. 2, even though completion suggestion 214 is closer to the entered partial query 204, spelling-corrected completion suggestion 216 is ranked higher in list 212. The ranking shown in list 212 may be a natural output of a machine-learning model that has been trained using training data in which the web site corresponding to the term "mediasite" is often searched for or selected in spelling corrections or completions (e.g., "mediasite" may be an extremely popular social media website that is accessed using search results generated responsive to many different misspelled and/or partial search queries) more often that searches for, or including, the word "message" are performed.

The user of electronic device 115 may request an internet search for either "mediasite" or "message" by selecting the corresponding query suggestion from list 212. A partial query may be a portion of a word as in the example of FIG. 2, or can include one or more complete words of a multi-word query. For example, the user may enter "where is the closest", which may be a portion of or a partial query corresponding to the query "where is the closest gas station".

In the example of FIG. 2, spelling-corrected completion suggestion 216 contains a modification of partial query 204 (e.g., a modification of a portion of a search query such as a modification that replaces the letter "s" to the letter "d") and additional characters that were not included in partial query 204. In the example of FIG. 2, completion suggestion 214 includes the same three characters as those included in partial query 204 and additional characters that were not included in partial query 204. However, it should also be appreciated that server 120 may return a spelling-corrected version of a portion of a search query (e.g., of partial query 204) that contains a modification of the portion of the search query in which one, two, or all of the characters of the portion of the search query are replaced with a different character, and that includes no additional characters.

As shown in the example of FIG. 2, partial query 204 may be a portion of a word in a language (e.g., a human-readable language such as English, Spanish, Chinese, French, or the like) and each suggested search query in 212 includes at least that word or another word in the same language (e.g., in contrast with machine-translation models that are used to translate complete words or phrases in one language to complete words or phrases in a different language). Although FIG. 2 depicts a partial query that is a portion of a single word, partial queries may include multiple complete words that form a portion of a search phrase and/or one or more partial words. When a partial query with multiple words is provided to server 120, the machine-learning model may attempt to generate query suggestions by inputting the entire partial phrase into the model and/or may break down the partial phrase into individual words and/or partial words for separate input.

Figure 3:
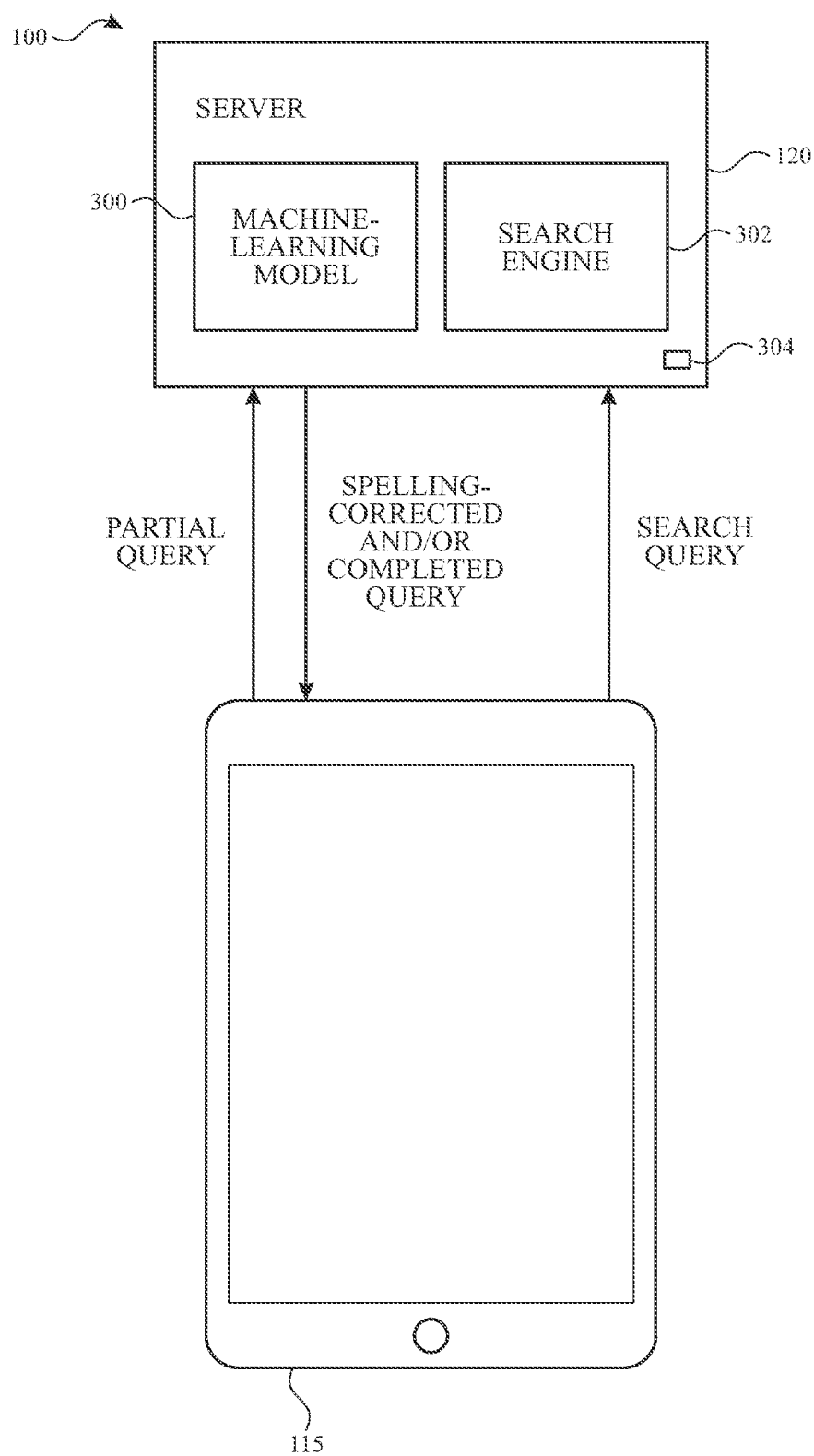
FIG. 3 illustrates various data exchange operations for correcting and completing search queries in accordance with one or more implementations.

FIG. 3 illustrates an exemplary data flow between electronic device 115 and server 120 for generating and providing suggested queries to electronic device 115, based on partial queries received at server 120 from electronic device 115. As shown in FIG. 3, electronic device 115 may transmit a partial query (e.g., partial query 204) to server 120. Electronic device 115 may, for example, submit a new partial query each time the user of electronic device 115 enters a new character into a search field and without direct submission instructions from the user (e.g., direct submission instructions input by pressing an enter key or selecting a displayed search icon).

The partial query is provided to machine-learning model 300 and may be displayed by device 115 as described above in connection with FIG. 2. As shown in FIG. 3, machine-learning model 300 generates spelling-corrected versions of the partial query, completion suggestions for the partial query, and/or spelling-corrected completion suggestions for the partial query, using model weights that have been tuned in a model training process using training data as described herein. Machine-learning model 300 may be a model for a particular language (e.g., a human language such as English, Spanish, French, Chinese, Japanese, Korean, or the like). Server 120 may include multiple machine-learning models, one for performing spelling corrections and/or completions of partial queries within each language (e.g., in contrast to machine-learning models that translate whole words or phrases from one language to a different language). The particular language corresponding to the machine-learning model 300 may be determined by, for example, a default language selected on the electronic device 115 and/or the default language used by the web page or application from which the search was input.

As shown in FIG. 3, electronic device 115 may subsequently transmit a search query to server 120. The search query may be a selected one of the spelling-corrected versions of the partial query, completion suggestions for the partial query, and/or spelling-corrected completion suggestions for the partial query that were provided from server 120 based on the received partial query, or may be a directly entered search query submitted by the user without modification by electronic device 115 or server 120. In the example of FIG. 3, server 120 also includes a search engine 302 and other elements 304. Although the example of FIGS. 2 and 3 show machine-learning model 300 disposed at server 120 and transmission of information between electronic device 115 and server 120 is described to perform partial query completion and/or correction, it should be appreciated that machine-learning model 300 can be disposed at electronic device 115 (or any other user device such as electronic device 110 of FIG. 1) such that correction and/or completion of partial queries can also or alternatively be performed locally on the user's device.

Figure 4:
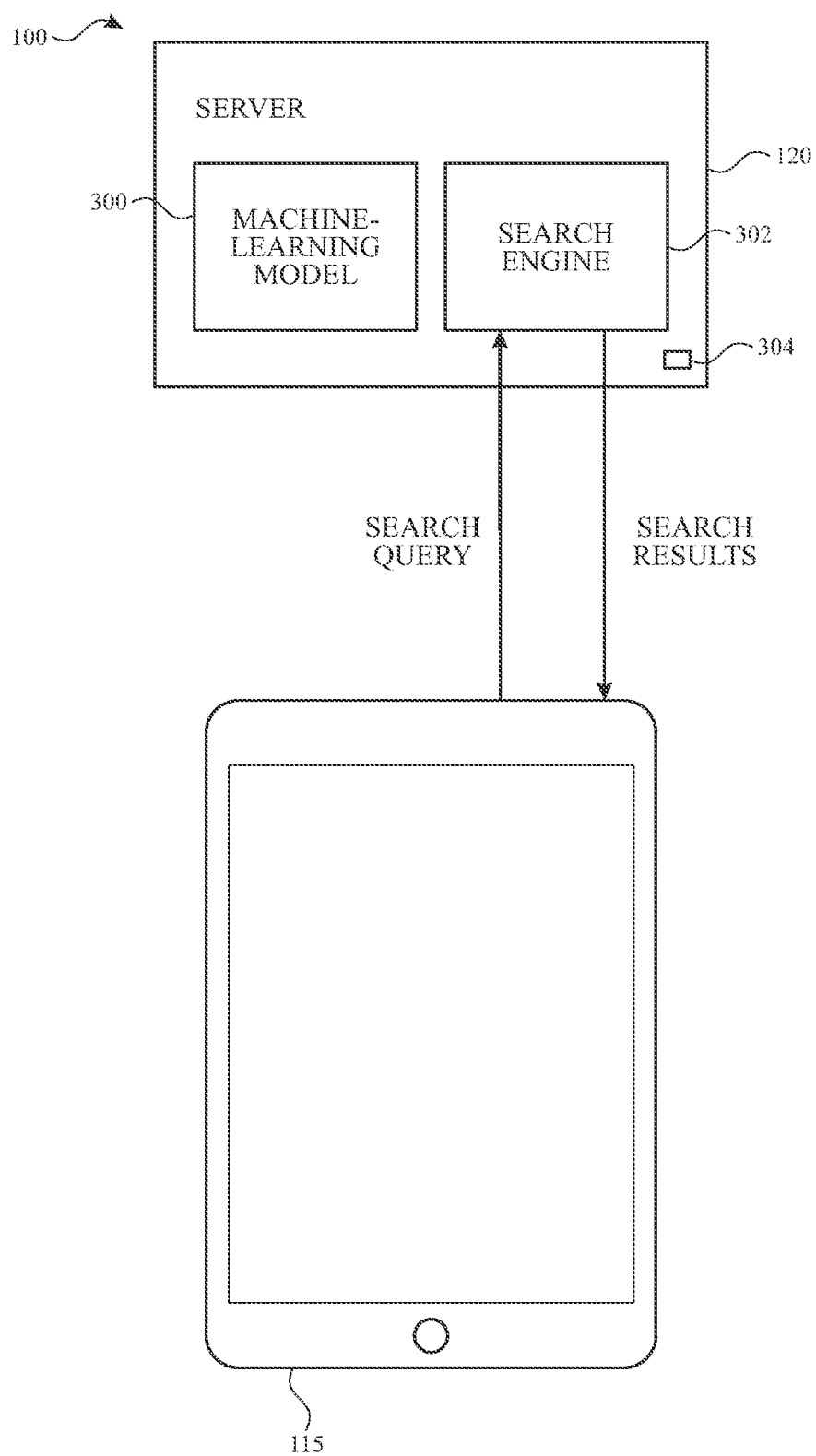
FIG. 4 illustrates various data exchange operations that may be performed responsive to selection of a search query suggestion in accordance with one or more implementations.

As shown in FIG. 4, the search query provided from electronic device 115 may be provided to search engine 302. It should be appreciated, however, that search engine 302 may reside on a different server and the search query may be provided to that different server, in some implementations. Upon receipt of the search query from electronic device 115, search engine 302 performs a network search (e.g., an internet search) for network locations and/or network content related to the search query. Search engine 302 returns search results to electronic device 115 which may be displayed in, for example, application content display field 208.

In some implementations, the search query may also be provided to machine-learning model 300, to be added (e.g., along with one or more partial queries 204 that resulted in a suggested query that was selected as the search query), for example, to future training data for fine tuning or updating of machine-learning model 300.

Figure 5A:
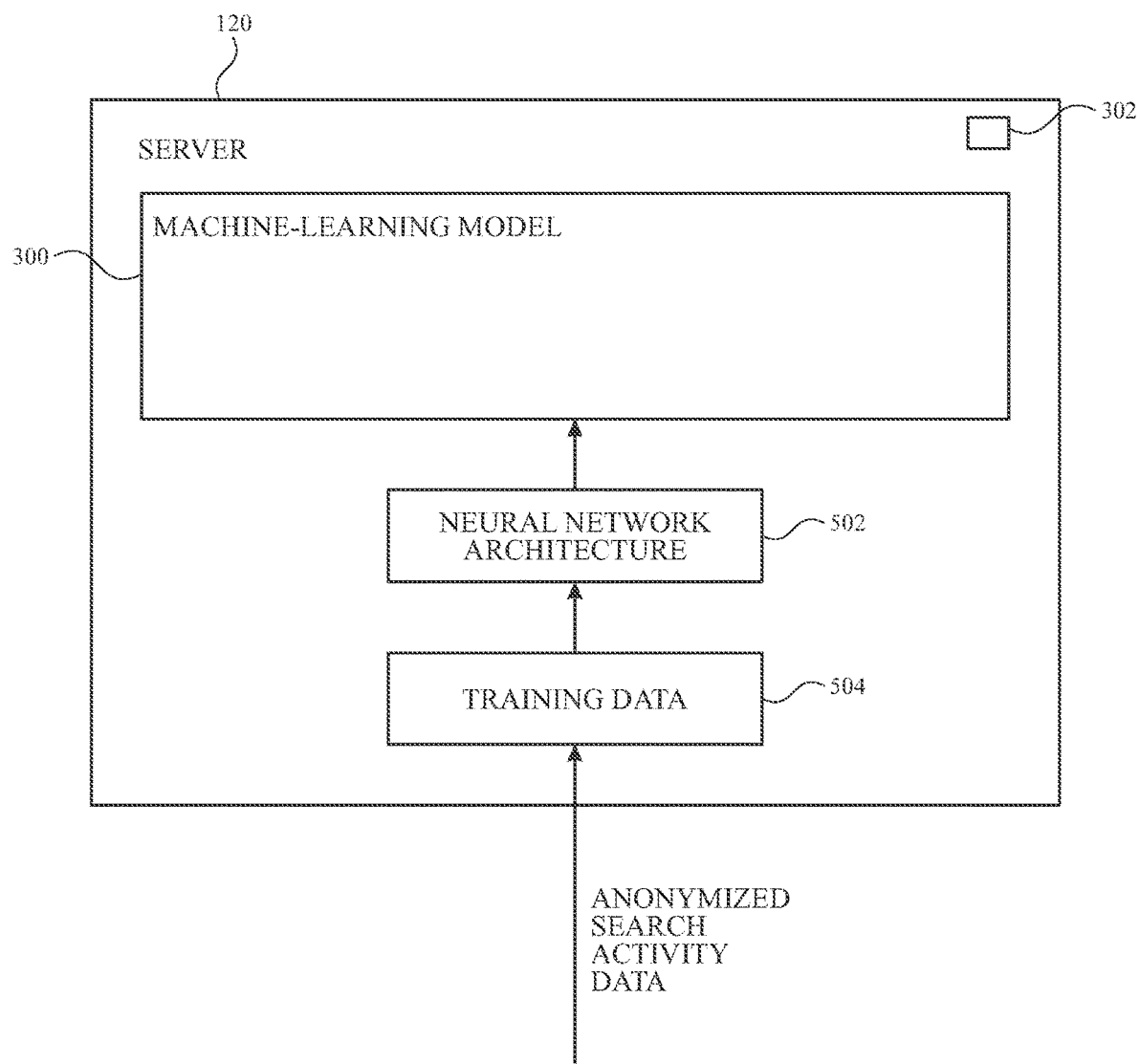
FIG. 5A illustrates various data exchange operations for training a machine-learning model in accordance with one or more implementations.

FIG. 5A shows various data flows that may be related to training of a machine-learning model for spell-correcting and/or completing partial search queries. As shown in FIG. 5A, machine-learning model 300 may be the product of a neural network architecture 502 (e.g., a deep neural network encoder-decoder architecture as described in further detail in connection with, for example, FIG. 9).

As shown in FIG. 5A, server 120 (or another server) may receive search activity data such as anonymized search activity data. The anonymized search activity data may be received from user devices such as electronic devices 110 and 115 of FIG. 1, from other electronic devices, from a vendor server, and/or from another server. The search activity data includes data associated with previous search activity (e.g., submissions of partial and complete queries, selections of suggested queries and/or suggested query completions, and/or user-engaged network destinations or digital objects associated with searches performed by various users). The anonymized search activity data may be stored at the server 120, or elsewhere, as training data 504 for machine-learning model 300.

The anonymized search activity data may include partial search queries and/or complete search queries. The partial search queries may be transmitted to the server as the partial search queries are entered into the user devices, and include misspelled partial queries, correctly spelled partial queries, misspelled complete queries, and/or correctly spelled complete queries. The search activity data may be anonymized, for example, by removing any identifying information of the user before the information is transmitted from the user's device.

The anonymized search activity data also may include selected spelling corrections and/or selected completions associated with each of the partial search queries (e.g., the anonymized search activity data may include pairs of partial search queries and selected spelling corrections and pairs of partial search queries and selected completions). The selected spelling corrections may have been entered by the user or selected by the user from suggested corrections that were provided to the user device from the server (or another server) based on a statistical spelling correction process that provides suggested spelling-corrected versions of partial or whole search queries (e.g., based on a lookup table such as lookup table 500). The selected completions may have been entered by the user or selected by the user from suggested completions provided to the user device from the server (or another server) based on a statistical completions process that provides suggested completions of partial or whole search queries (e.g., based on a lookup table such as lookup table 500). The anonymized search activity data may be received from individual user devices, or server 120 may receive an entire data set of anonymized partial search queries and corresponding selected completions and corrections, such as from a vendor server and/or another server.

Training data 504 is provided to neural network architecture 502 for training the neural network to produce machine-learning model 300 (e.g., by tuning parameters such as weights, biases, thresholds, and/or other aspects of the model) so that future partial queries that are provided to the model (e.g., partial queries such as partial query 204 of FIG. 2 that are not included in the training data) generate spelling-corrected versions, completion suggestions, and/or spelling-corrected completion suggestions for that partial query. For example, training the neural network, to produce machine-learning model 300, may include providing the neural network with pairs of the previous partial search queries and previously selected spelling corrections and/or pairs of the previous partial search queries and previously selected completions, each pair including a previous partial search query and a previously selected spelling correction or a previously selected completion that was engaged by the user in association with that particular partial search query. In some implementations, training the machine-learning model (e.g., training the neural network to generate the model) may include training the model (e.g., adjusting the parameters of the model) with a training dataset, tuning the model (e.g., by further adjusting the parameters and/or modifying hyperparameters such as a learning rate for training the model) with a validation training set, and then testing the model with a test data set (which the model has not previously seen). The anonymized search data may be filtered to only include frequent partial queries and selected queries or user engagements.

The previous user queries may include a portion of a word in a human language as described herein and may include at least one incorrect character. The previously selected spelling corrections may include the word, with the at least one incorrect character replaced with at least one corresponding correct character. The previously selected completions may include a search query or a network destination that has been selected by a user for submission to the server or another server. For example, a previous user query may include an incorrectly spelled word such as "ecit" and a previously selected spelling correction that may have been provided to the user and selected by the user may include the correctly spelled word "exit". As another example, a previous user query may include a partial query such as a portion of a word such as "garag" and a previously selected completion that may have been provided to the user and selected by the user may include the complete word "garage". In these examples, "ecit" and "exit" would form an input-output pair in the training data 504 and "garag" and "garage" would form another input-output pair in the training data.

Figure 5B:
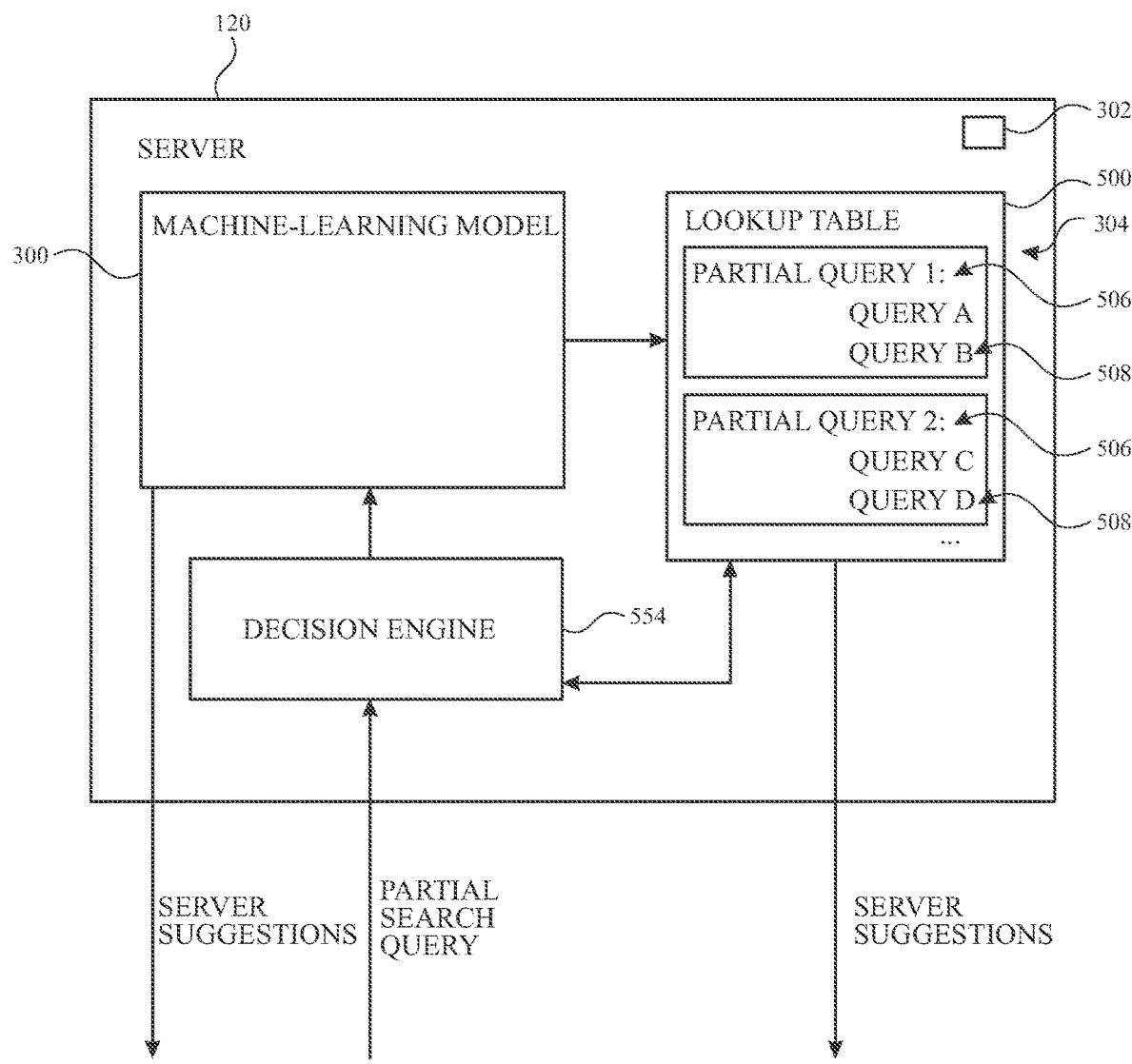
FIG. 5B illustrates various data exchange operations for running a machine-learning model in accordance with one or more implementations.

FIG. 5B shows how other elements 304 may be implemented to include a lookup table such as lookup table 500 (or other storage) that maps previously entered partial queries with previously selected/engaged complete search queries. Lookup table 500 may include data similar to, based on, or overlapping with, the anonymized search activity data. For example, in the example of FIG. 5B, lookup table 500 includes stored portions 506 of search queries (e.g., partial queries such as PARTIAL QUERY 1 and PARTIAL QUERY 2) that were previously provided by one or more user devices. Lookup table 500 also includes suggested search queries 508 that are stored in association with each of the stored portions 506 of the search queries.

In the example of FIG. 5B, lookup table 500 includes two suggested search queries 508 (e.g., QUERY A and QUERY B) for a first partial query (e.g., PARTIAL QUERY 1) and includes two suggested search queries 508 (e.g., QUERY C and QUERY D) for a second partial query (e.g., PARTIAL QUERY 2). However, it should be appreciated that lookup table 500 may include any number of partial queries and any number of associated search suggestions, each partial query/search suggestion pair having been previously submitted and/or selected by one or more users.

In some operational scenarios, server 120 may use machine-learning model 300 to generate all suggested queries (server suggestions) from all received partial search queries (correctly spelled or misspelled) and/or all received misspelled complete search queries. In other operational scenarios (e.g., to reduce latency in providing the suggested queries), server 120 may use lookup table 500 to provide suggested search queries 508 as search suggestions to a user device, if or when a received partial query is stored in the lookup table (e.g., as one of stored portions 506). In these operational scenarios in which lookup table 500 is used, server 120 may include a decision engine 554 that determines whether a received partial search query matches any of the stored portions 506 in lookup table 500, causes server 120 to return one or more suggested search queries 508 as search suggestions if the received partial search query matches any of the stored portions 506, or provides the received partial search query to machine-learning model 300 to generate the suggested search queries using machine-learning model 300 only if the partial search query does not correspond to any of the stored portions 506 of the search queries in lookup table 500.

It should also be appreciated that machine-learning model 300 can, if desired, be used in reverse (e.g., by running the machine-learning model with complete queries as inputs to the model to generate partial and/or complete queries that are correctly and/or incorrectly spelled) to generate and add entries to lookup table 500, even if one or both of the entries have never been provided by any user. For example, if a new search query is being commonly provided to one or more search engines (e.g., due to a new website release or update or a popular news item), machine-learning model 300 may be run in reverse to leverage the model's machine-learned implicit knowledge of, for example, keyboard layouts and/or morpho-phonetic similarities to the new search query, to anticipate, generate, and store, correctly spelled and/or incorrectly spelled partial and/or complete queries that users may soon be entering on their own devices in attempts to enter the new search query. Correctly spelled and/or incorrectly spelled partial and/or complete queries can also be generated using machine-learning model 300 for complete queries that have never been provided to the server from a remote user (e.g., for dictionary words or phrases and/or to generate an initial lookup table for a new language).

Figure 6:
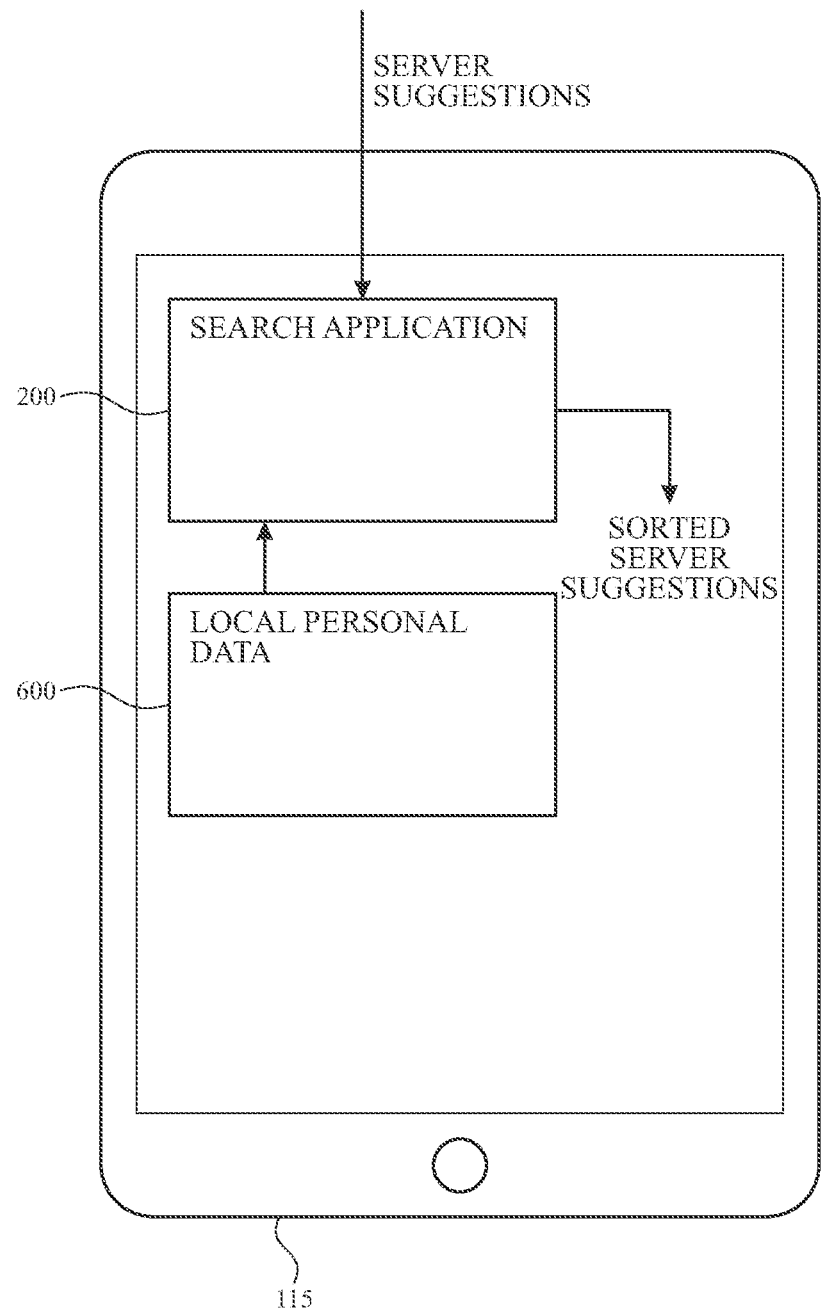
FIG. 6 illustrates various data exchange operations for sorting query suggestions using user data in accordance with one or more implementations.

FIG. 6 shows how, in some implementations, personal data such as personal data 600 that is stored at the user's own device (e.g., electronic device 115), can be used to sort and/or re-rank server suggestions such as list 212 of server suggested search queries. For example, the electronic device 115 may receive the suggested search queries from the server and then re-rank the suggested search queries based on personal data 600 (e.g., if the user was recently using the mediasite app, electronic device 115 can move suggested search queries related to "mediasite" higher in list 212). In this way, server 120 and electronic device 115 can cooperate to generate a personalized list of sorted server and/or local suggestions for the user. In this manner, the power of machine-learning model 300 to simultaneously spelling-correct and complete user queries such as partial query 204 can be combined with known user data to provide an enhanced user search experience, without storing personal data for the user at the server.

However, it should also be appreciated that, in an alternative embodiment, the electronic device 115 can send topic information pertaining to user interest/activity to the server, and the sorting of query suggestions can be performed at the server. For example, if the server knows some information regarding the user (e.g. based on the broad topics), the server could potentially re-rank the suggestions output by the machine-learning model based on known user data (e.g. if the user is a frequent mediasite user, then suggested search queries related to "mediasite" might be ranked higher that originally ranked in list 212). In this alternative embodiment, topic categories for which user interest/activity information is provided to the server may be pre-selected to be broad enough that no individual user can be identified from the provided data (e.g., the data is anonymized). However, it should also be appreciated that server 120 can store information describing one or more users (e.g. when privacy is not a concern) and can perform the sorting of query suggestions based on the stored user information.

Figure 7:
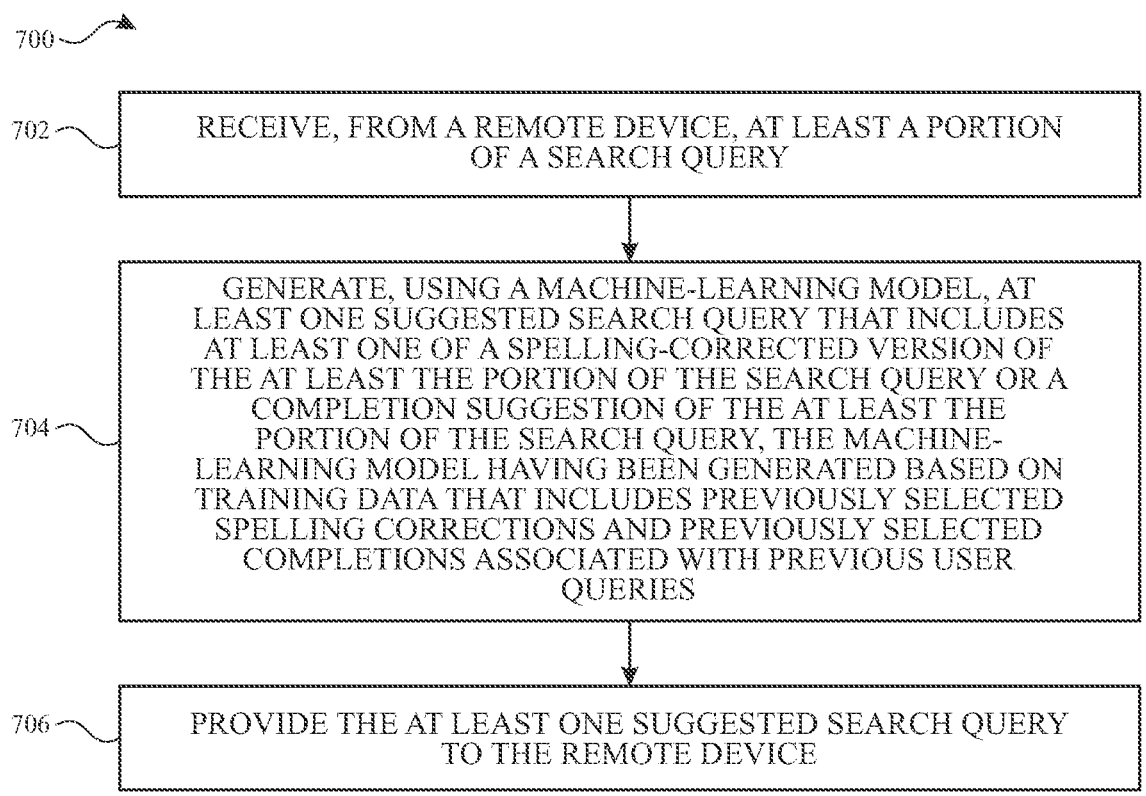
FIG. 7 illustrates a flow diagram of an example process for generating suggested search queries using a machine-learning model in accordance with one or more implementations.

FIG. 7 illustrates a flow diagram of an example process 700 for generating suggested search queries that include spelling corrections and/or completions of partial search queries in accordance with one or more implementations. For explanatory purposes, the process 700 is primarily described herein with reference to one or more devices of FIG. 1 (particularly with reference to server 120), which may be executed by one or more processors of the server 120 of FIG. 1. However, the process 700 is not limited to the server 120, and one or more blocks (or operations) of the process 700 may be performed by one or more other components of other suitable devices, such as one or more of the electronic device 110, or the electronic device 115. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, an apparatus such as server 120 or another electronic device as described herein of FIG. 1 receives, from a remote device such as electronic device 115, at least a portion of a search query (see, e.g., partial query 204 of FIG. 2).

At block 704, the apparatus generates, using a machine-learning model such as machine-learning model 300 of FIG. 3, at least one suggested search query (see, e.g., spelling-corrected completion suggestion 216 and a completion suggestion 214 of FIG. 2) that includes at least one of a spelling-corrected version of the at least the portion of the search query or a completion suggestion of the at least the portion of the search query, the machine-learning model having been generated based on training data (see, e.g., training data 504) that includes previously selected spelling corrections and previously selected completions that are associated with (e.g., paired with corresponding) previous user queries (e.g., training data that includes spelling corrections and query completions previously selected responsive to prior user queries).

At block 706, the apparatus provides the at least one suggested search query to the remote device. The device may display the at least one suggested search query that has been received from the server for selection and may send a selected one of the at least one suggested search queries back to the server or another server (e.g., to a search engine such as search engine 302) for an internet search (or other search) for the search query. Although various operations associated with blocks 702, 704, and 706 are described as being performed at a server such as server 120, it should be appreciated that some or all of the operations associated with blocks 702, 704, and 706 can be performed by a user device such as electronic device 115 (or any other user device such as electronic device 110 of FIG. 1) such that correction and/or completion of partial queries can also or alternatively be performed locally on the user's device.

Figure 8:
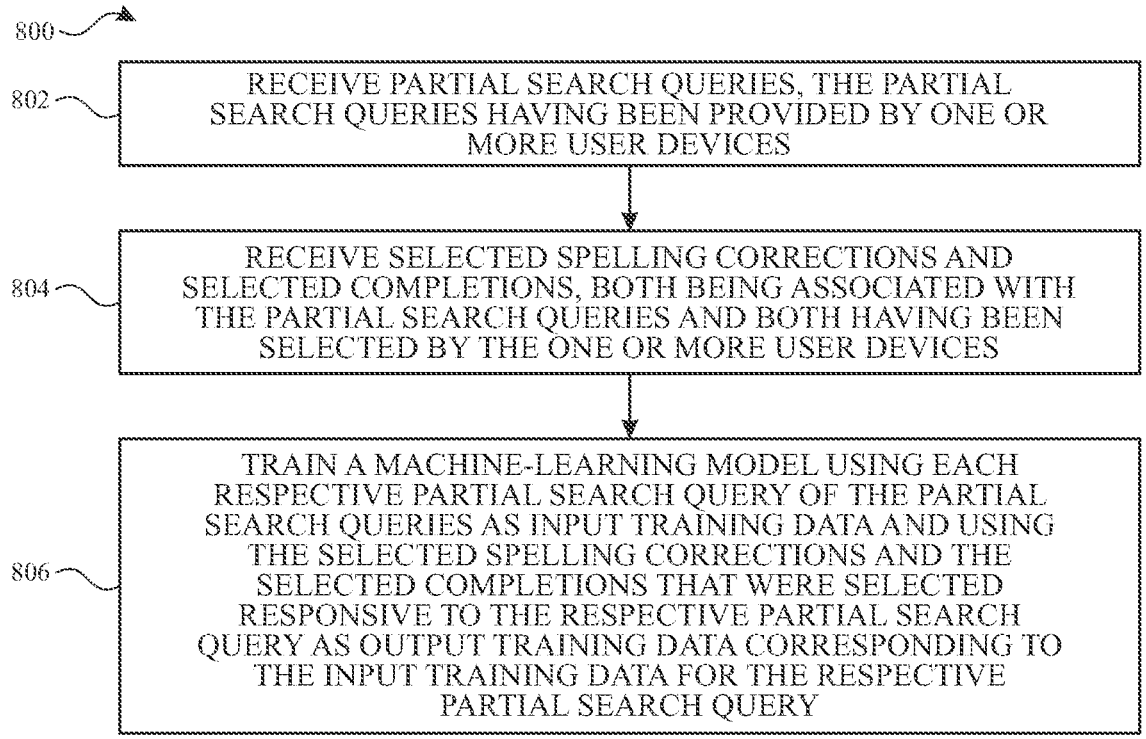
FIG. 8 illustrates a flow diagram of an example process for training a machine-learning model in accordance with one or more implementations.

FIG. 8 illustrates a flow diagram of an example process 800 for training a machine-learning model for generating suggested search queries that include spelling corrections and/or completions of partial search queries in accordance with one or more implementations. For explanatory purposes, the process 800 is primarily described herein with reference to one or more devices of FIG. 1 (particularly with reference to server 120), which may be executed by one or more processors of the server 120 of FIG. 1. However, the process 800 is not limited to the server 120, and one or more blocks (or operations) of the process 800 may be performed by one or more other components of other suitable devices, such as one or more of the electronic device 110, or the electronic device 115. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, a server such as server 120 receives one or more partial search queries, the partial search queries having been provided by one or more user devices such as electronic device 110 and electronic device 115. The server may receive the partial search queries directly from the user devices or may receive the partial search queries in one or more batches or sets of data from a vendor or another server. The partial search queries may be included in anonymized search activity data that is transmitted to the server, to another server, or to a vendor as, or after, the partial search queries are typed by users of the user devices, as described above in connection with, for example FIG. 5A. The partial search queries may include at least one misspelled partial query.

At block 804, the server receives one or more selected spelling corrections and one or more selected completions, both being associated with the partial search queries and both having been selected by the one or more user devices. The server may receive the selected spelling corrections and the selected completions directly from the user devices or may receive the partial search queries in one or more batches or sets of data from a vendor or another server. The selected spelling corrections may also be included in the anonymized search activity data and may, in some scenarios, have been previously provided to the user devices from the server (or another server) based on a statistical spelling correction process that provides suggested spelling-corrected versions of partial or whole search queries (e.g., based on a lookup table such as lookup table 500). The selected completions may also be included in the anonymized search activity data and may, in some scenarios, have been previously provided to the user devices from the server (or another server) based on a statistical completions process that provides suggested completions of partial or whole search queries (e.g., based on a lookup table such as lookup table 500). In one or more implementations, the server 120 may receive an entire data set of anonymized partial search queries and corresponding selected completions, such as from a vendor server and/or another server.

At block 806, the server trains a machine-learning model using each respective partial search query of the partial search queries as input or source training data and using the selected spelling corrections and the selected completions that were selected responsive to the respective partial search query as output or target training data corresponding to the input training data for the respective partial search query. The machine-learning model may include a deep neural network encoder-decoder architecture. For example, the deep neural network encoder-decoder architecture may include an encoder that encodes a variable-length input sequence (e.g., a partial query) into a fixed-length context vector, a decoder that decodes the fixed-length context vector into variable-length output sequence (e.g., a suggested query that has been spelling corrected and/or completed), and/or an attention layer that facilitates spelling-correction and/or completion by increasing the flexibility with which the input sequence is encoded, as would be understood by one skilled in the art.

Figure 9:
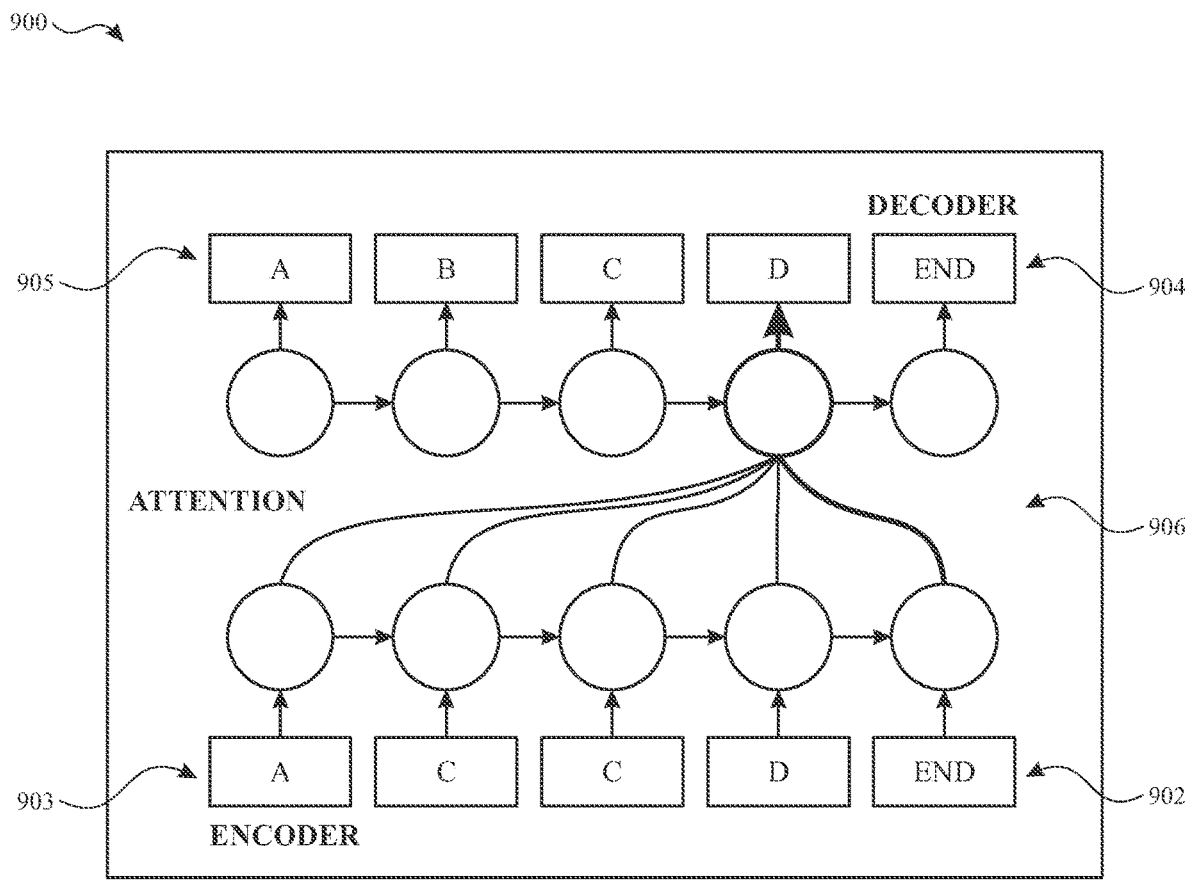
FIG. 9 illustrates a schematic diagram showing an exemplary encoder-decoder architecture for a machine-learning model in accordance with one or more implementations.

FIG. 9 illustrates a schematic diagram of a deep neural network encoder-decoder architecture 900 that includes an encoder 902 that may be used to encode (e.g., transform) a variable-length input sequence 903 (e.g., a partial query and/or a misspelled query such as "aced") into a fixed-length context vector, a decoder 904 that may be used to decode the fixed-length context vector into variable-length output sequence 905 (e.g., a suggested query correction and/or completion such as "abed"), and an attention layer 906 that may be included to facilitate spelling-correction and/or completion by increasing the flexibility with which the input sequence is encoded.

In some scenarios, forced decoding may be performed using a machine-learning model such as machine-learning model 300 described herein. In a forced decoding operation, machine-learning model 300 is forced to generate a given target from a given source, and to assign a score to the pairing of the given target and the given source. Forced decoding operations may be useful in, for example, ranking completions and/or corrections generated by other methods (e.g., ranking the entries of lookup table 500).

An input observation can be represented as a sequence of words, portions of words, characters, or character n-grams for processing. The trained machine-learning model includes parameters (e.g., weights such as weights for connections between units of the deep neural network, biases, thresholds, and/or other parameters of the deep neural network) that have been selected to generate the desired output sequences from each input sequence, based on the training data. As noted above, in use, an output sequence such as variable-length output sequence 905 generated by a trained machine-learning model may be provided with a score that can be used to rank each output sequence relative to each other output sequence. Scores for model outputs may, for example, be higher for suggested spelling corrections that correspond to corrections of intrinsically machine-learned keyboard layout based errors and/or morpho-phonetic errors. Moreover, intrinsically learned error types such as intrinsically machine-learned keyboard layout based errors and/or morpho-phonetic errors that have been learned by the machine-learning model can be used to rank suggested completions and/or suggested corrections from lookup table 500 (e.g., by running a forced decoding operation for each of one or more pairs of stored portions 506 and suggested queries 508 to generate a score for each pair that is informed by the model's intrinsically learned error types). In this way, the rankings of lookup table entries may be improved and/or entries from lookup table 500 can be interleaved, based on their scores, with model-generated suggested completions and/or suggested corrections.

As described above, one aspect of the present technology is the gathering and use of data available from various sources to improve the delivery to users of search query suggestions that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver search query suggestions that are of greater interest to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of search query suggestions, the present technology can be configured to allow users to select to "opt in" or "opt out" of participation in the collection of personal information data during registration for services or anytime thereafter. In another example, users can select not to provide search activity data for targeted search query suggestion services. In yet another example, users can select to limit the length of time search activity data is maintained or entirely prohibit the development of a baseline search query profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, search query suggestions can be sorted for providing to users by inferring preferences based on non-personal information data or a bare minimum amount of personal information, such as the content being requested by the device associated with a user, other non-personal information available to the search query suggestion services, or publicly available information.

Figure 10:
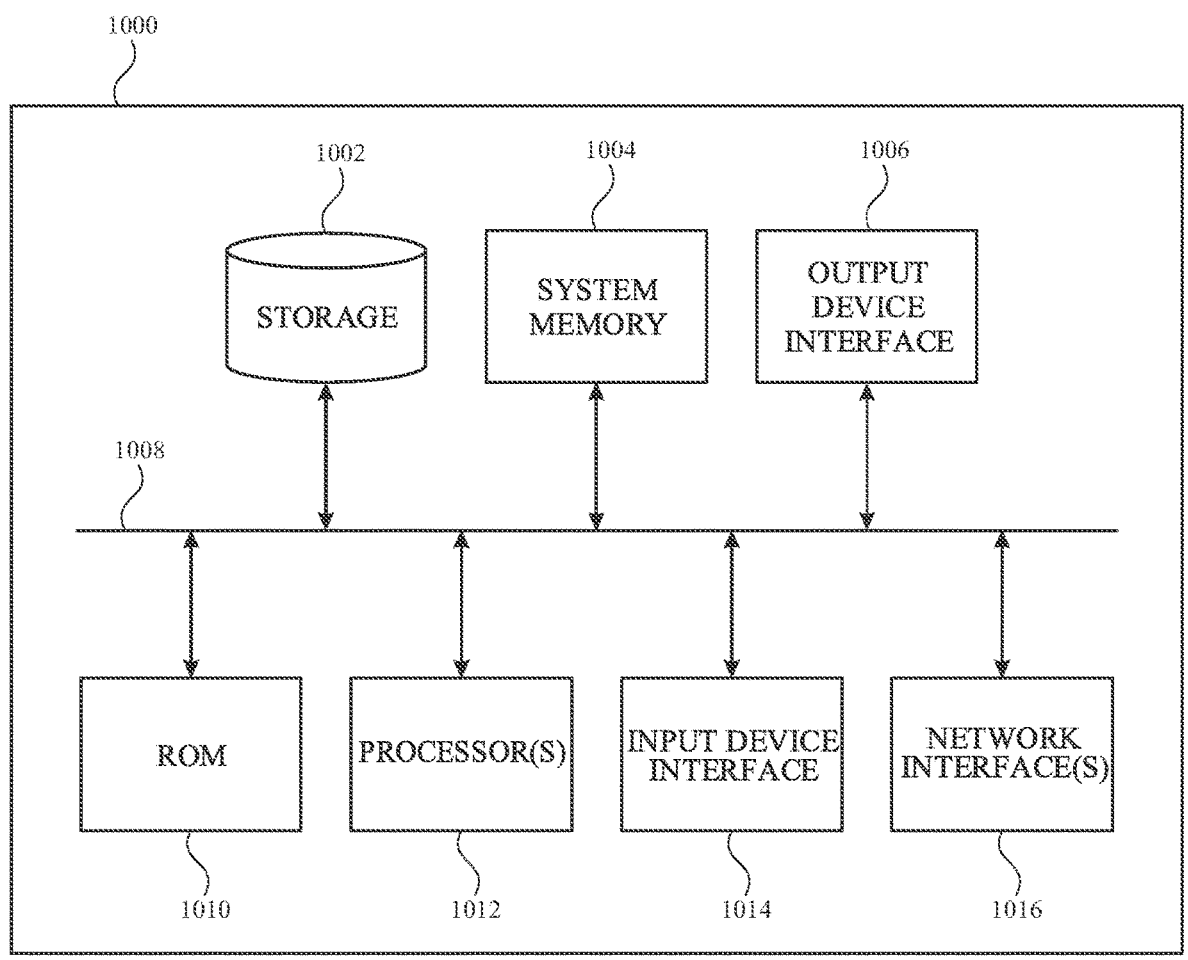
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, the electronic device 110, the electronic device 115, and/or the server 120 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 115 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

In accordance with various aspects of the subject disclosure, an apparatus is provided that includes a memory and at least one processor, communicatively coupled to the memory and configured to receive, from a remote device, at least a portion of a search query. The at least one processor is also configured to generate, using a machine-learning model, at least one suggested search query that includes at least one of a spelling-corrected version of the at least the portion of the search query or a completion suggestion of the at least the portion of the search query, the machine-learning model having been generated based on training data that includes previously selected spelling corrections and previously selected completions each paired with a corresponding previous user query. The at least one processor is also configured to provide the at least one suggested search query to the remote device.

In accordance with various aspects of the subject disclosure, a non-transitory computer-readable medium is provided that includes instructions, which when executed by at least one computing device, cause the at least one computing device to perform operations that include receiving at least a portion of a search query. The operations also include generating, using a machine-learning model, at least one suggested search query that includes at least one of a spelling-corrected version of the at least the portion of the search query or a completion suggestion of the at least the portion of the search query, the machine-learning model having been generated based on training data that includes spelling corrections and query completions previously selected responsive to prior user queries.

In accordance with various aspects of the subject disclosure, a method is provided that includes receiving a plurality of partial search queries, the plurality of partial search queries having been provided by one or more of a plurality of user devices. The method also includes receiving a plurality of selected spelling corrections and a plurality of selected completions, both being associated with the plurality of partial search queries and both having been selected by the one or more of the plurality of user devices. The method also includes training a machine-learning model using each respective partial search query of the partial search queries as source training data and using the selected spelling corrections and the selected completions that were selected responsive to the respective partial search query as target training data corresponding to the input training data for the respective partial search query.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A server, comprising:
    a memory; and
    at least one hardware processor, communicatively coupled to the memory and configured to:
        receive, electronically from a remote device, at least a portion of a search query that has been received as typed text input to the remote device;
        generate, using a machine-learning model, at least one suggested search query that includes at least one of: a spelling-corrected version of the at least the portion of the search query, or a completion suggestion of the at least the portion of the search query, the machine-learning model comprising a neural network having been trained to generate spelling-corrected completion suggestions for partial queries based on training data that includes previously selected spelling corrections and previously selected completions each paired with a corresponding previous user query,
        wherein generating the at least one suggested query using the machine-learning model comprises generating a simultaneously spelling-corrected completion suggestion as a single output of a joint process of the neural network and responsive to providing the at least the portion of the search query as input to the neural network; and
        provide the at least one suggested search query to the remote device.

2. The server of claim 1, wherein the at least the portion of the search query comprises at least three characters.

3. The server of claim 2, wherein the spelling-corrected version of the at least the portion of the search query contains a modification of the at least the portion of the search query in which at least one of the at least three characters is replaced with a different character.

4. The server of claim 3, wherein the completion suggestion is a spelling-corrected completion suggestion that contains the modification of the at least the portion of the search query and at least one additional character.

5. The server of claim 2, wherein the completion suggestion of the at least the portion of the search query contains:
    the at least three characters; and
    at least one additional character.

6. The server of claim 2, wherein the spelling-corrected version of the at least the portion of the search query contains a modification of the at least the portion of the search query in which all of the at least three characters are replaced with different corresponding characters.

7. The server of claim 1, wherein the at least one suggested search query comprises a ranked list of spelling-corrected completion suggestions, each of which is a direct output of the machine-learning model.

8. The server of claim 7, wherein each of the spelling-corrected completion suggestions in the ranked list is output from the machine-learning model with a score, and wherein the ranked list is generated using the scores and without further input.

9. The server of claim 8, wherein the scores are based, at least in part, on at least one keyboard layout intrinsically learned by the machine-learning model based on the training data.

10. The server of claim 8, wherein the scores are based, at least in part, on at least one morpho-phonetic similarity intrinsically learned by the machine-learning model based on the training data.

11. The server of claim 1, wherein the at least one processor is further configured to:
    determine whether the at least the portion of the search query corresponds to any stored portions of search queries; and
    provide, to the remote device and if the at least the portion of the search query corresponds to one of the stored portions of the search queries, a suggested search query that is stored in connection with the one of the stored portions of the search queries.

12. The server of claim 11, wherein the at least one processor is further configured to generate the at least one suggested search query using the machine-learning model only if the at least the portion of the search query does not correspond to any of the stored portions of the search queries.

13. The server of claim 1, wherein the at least the portion of the search query includes at least portion of a word in a language and wherein the at least one suggested search query includes the word in the same language.

14. The server of claim 1, wherein the at least the portion of the search query is not included in the training data.

15. The server of claim 1, wherein at least one of the previous user queries includes a portion of a word in a human language, the portion containing at least one incorrect character.

16. The server of claim 15, wherein at least one of the previously selected spelling corrections comprises the word, with the at least one incorrect character replaced with at least one corresponding correct character.

17. The server of claim 16, wherein at least one of the previously selected completions is a search query that has been selected by a user for submission to a search engine.

18. A non-transitory computer-readable medium comprising instructions, which when executed by at least one computing device having one or more hardware processors, cause the at least one computing device to perform operations comprising:

receiving, electronically from a remote device, at least a portion of a search query that has been received as typed text input to the remote device; and generating, using a machine-learning model, at least one suggested search query that includes at least one of: a spelling-corrected version of the at least the portion of the search query, or a completion suggestion of the at least the portion of the search query, the machine-learning model comprising a neural network having been trained to generate spelling-corrected completion suggestions for partial queries based on training data that includes spelling corrections and query completions previously selected responsive to prior user queries, wherein generating the at least one suggested query comprises generating a simultaneously spelling-corrected completion suggestion as a single output of a joint process of the neural network and responsive to providing the at least the portion of the search query as input to the neural network.

19. The non-transitory computer-readable medium of claim 18, wherein the neural network is based on a deep neural network encoder-decoder architecture.

20. The non-transitory computer-readable medium of claim 18, wherein the operations further comprise:

generating, using a reverse of the machine-learning model, at least a portion of an additional search query based on one of the previously selected completions; and storing the generated portion of the additional search query in association with the one of the previously selected completions.

21. The non-transitory computer-readable medium of claim 18, wherein the operations further comprise:

performing a forced decoding operation, with the machine-learning model, for the at least the portion of a search query and at least one additional suggested search query; and generating a score for the at least one additional suggested search query based on the forced decoding operation.

22. A method, comprising:

receiving, by one or more hardware processors electronically from a remote device, at least a portion of a search query that has been received as typed text input to the remote device;

generating, by the one or more hardware processors using a machine-learning model, at least one suggested search query that includes at least one of: a spelling-corrected version of the at least the portion of the search query, or a completion suggestion of the at least the portion of the search query, the machine-learning model comprising a neural network having been trained to generate spelling-corrected completion suggestions for partial queries based on training data that includes previously selected spelling corrections and previously selected completions each paired with a corresponding previous user query, wherein generating the at least one suggested query using the machine-learning model comprises generating a simultaneously spelling-corrected completion suggestion as a single output of a joint process of the neural network and responsive to providing the at least the portion of the search query as input to the neural network; and providing, by the one or more hardware processors, the at least one suggested search query to the remote device.

23. The method of claim 22, wherein the plurality of partial search queries include at least one misspelled partial query, and wherein the neural network comprises a deep neural network encoder-decoder architecture.

* * * * *